Figure 4:
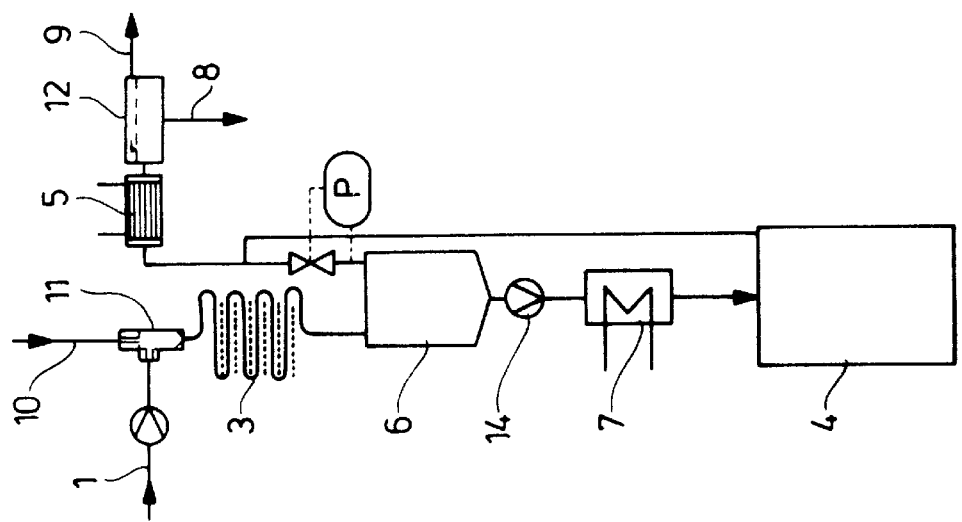

United States Patent

Wulff et al.

[11] Patent Number: 5,830,977
[45] Date of Patent: Nov. 3, 1998

[54] PROCESS FOR THE ISOLATION OF PARTIALLY CRYSTALLINE POLYCARBONATE POWDER

[75] Inventors: Claus Wulff, Krefeld; Gottfried Zaby, Leverkusen; Clemens Casper, Krefeld; Klemens Kohlgrüber, Kürten; Hugo Obermann, Dormagen; Steffen Kühling, Meerbusch, all of Germany

[73] Assignee: Bayer Aktiengesellschaft, Germany

[21] Appl. No.: 778,654

[22] Filed: Jan. 3, 1997

[30] Foreign Application Priority Data

Jan. 5, 1996 [DE] Germany .......................... 196 00 271.0
Jan. 5, 1996 [DE] Germany .......................... 196 00 272.9

[51] Int. Cl.⁶ ..................................................... C08G 64/00
[52] U.S. Cl. ........................... 528/196; 528/499; 528/501; 528/502; 528/503
[58] Field of Search ..................................... 528/196, 499, 528/501, 502, 503

[56] References Cited

U.S. PATENT DOCUMENTS 3,508,339  4/1970  Neblett ....................................... 34/368
4,212,967  7/1980  Goyoni et al. ........................... 528/500
4,568,418  2/1986  Walko et al. ............................. 159/481

FOREIGN PATENT DOCUMENTS 0 616 002 A1  9/1994  European Pat. Off. .
40 22 232 A1  1/1992  Germany .
41 34 483 A1  4/1993  Germany .

*Primary Examiner*—Terressa Mosley
*Attorney, Agent, or Firm*—Connolly & Hutz

[57] ABSTRACT

The present invention provides a process for the isolation of partially crystalline polycarbonate powder or oligocarbonate powder from solutions thereof, in which process the organic solvent of a polycarbonate solution is vaporized in a heat exchanger, optionally with incorporation of steam, or in a holding tube with incorporation of steam and the pasty mixture of concentrated solution, solvent vapor and optionally water is separated in a separator. In this process, the solvent vapor is condensed in a heat exchanger downstream from the separator. The solvent is vaporized in the heat exchanger by indirect input of heat through the heat exchanger walls and vaporization may be promoted by preheating the polycarbonate or oligocarbonate solution in an upstream heat exchanger or by introducing steam or both.

17 Claims, 2 Drawing Sheets

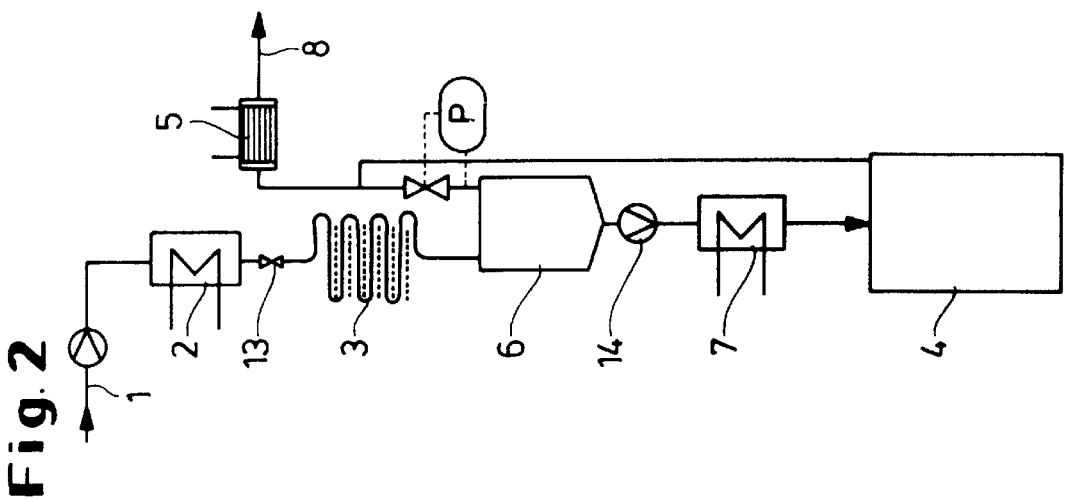
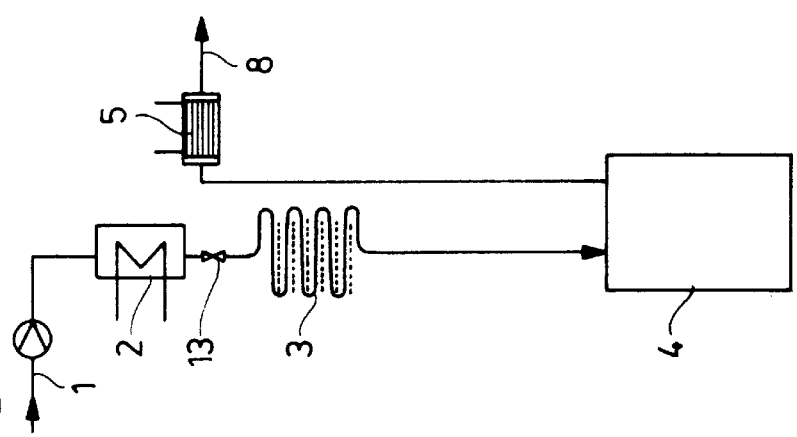

PROCESS FOR THE ISOLATION OF PARTIALLY CRYSTALLINE POLYCARBONATE POWDER

This invention relates to a process for the isolation of partially crystalline polycarbonate powder or oligocarbonate powder from polycarbonate or oligocarbonate solutions, in which process the organic solvent of a polycarbonate or oligocarbonate solution is vaporised in a heat exchanger, optionally with incorporation of steam, or in a holding tube with incorporation of steam, and the pasty mixture of concentrated solution, solvent vapour and optionally water is separated in a separator. In this process, the solvent vapour is condensed in a heat exchanger downstream from the separator. The solvent is vaporised in the heat exchanger by indirect input of heat through the heat exchanger walls and vaporisation may be promoted by preheating the polycarbonate or oligocarbonate solution in an upstream heat exchanger or by introducing steam or both. The separator may be operated at atmospheric pressure or under elevated pressure.

When operated at atmospheric pressure, the separator simultaneously acts as a crystalliser. Depending upon the grade of polycarbonate, the polycarbonate or oligocarbonate in the separator spontaneously takes the form of a crystalline solid or of a paste which crystallises when left to stand. Crystallisation time is dependent upon the grade of polycarbonate, the molecular weight, the solvent concentration, the addition of crystallisation nuclei and temperature.

When the separator is operated under elevated pressure, the concentrated solution takes the form of a flowable paste. The paste is conveyed by means of suitable pumps from the first separator into a second separator and depressurised therein under lower pressure. The paste may be heated between the two separators by being passed through a heat exchanger in order to increase vaporising efficiency on depressurisation. Step-wise vaporisation has the advantage that elevated vaporising efficiency is achieved with only slight direct introduction of steam. In this manner, for example, less steam is condensed in the concentrated polycarbonate solution and the powder obtained after standing and comminution may be dried with a lower energy input.

The polycarbonate powders obtained using this process are distinguished by crystallinity, by the fact that any remaining residual solvent may better be removed from them and by an elevated bulk density together with drying properties which are favourable in energy terms and particularly economic.

The oligocarbonate powders obtained using this process are distinguished by uniform crystallinity and grain size and also by the fact that residual solvent may better be removed. The are also distinguished by an elevated bulk density and by drying properties which are particularly favourable in energy terms and economic and by particularly good polycondensation properties in the solid phase. The phrase "good polycondensation properties" is taken to mean the increase in molecular weight, measured as the difference in solution viscosity on post-curing in a stream of inert gas, wherein highly viscous particles having a narrow molecular weight distribution are obtained.

It is known per se to isolate polycarbonates from solutions thereof using steam. U.S. Pat. No. 3,508,339 thus describes the use of a special nozzle in combination with a mixing chamber, in which the polycarbonate solution and steam are combined, and a subsequent tube of a constant diameter, in which the solvent is removed by drying. Patent U.S. Pat. No. 4,212,967 describes the combination of a De Laval type nozzle with a heated tube, the diameter of which increases starting from the nozzle.

Patent U.S. Pat. No. 4,568,418 describes the combination of a nozzle with a subsequent agglomeration tube, wherein the tube is characterised by a constant diameter and at least six semi-circular loops. However, the polycarbonate agglomerates obtained using this process have a low bulk density. This process moreover requires the use of large quantities of steam, so impairing its economic viability.

European published patent application EP 0 616 002 A1 describes a process for the production of polycarbonate powder of an elevated bulk density from methylene chloride solutions by combining steam with the polycarbonate solution in a nozzle, to which an unheated holding tube is connected.

Using these known processes, polycarbonate particles are obtained from which the organic solvent has largely been removed, but which have a water content of approximately 40% or, in the case of a lower water content, demand the use of extremely large quantities of steam during spraying, which renders the isolation process uneconomic. Post-drying is in any case also necessary in order to achieve very low residual solvent contents. The conditions necessary for this purpose, for example the time required and the plant volume required, which is directly dependent upon time, play an important part in the industrial practicability of the isolation process.

The polycarbonate particles obtained by hitherto known processes have not entirely satisfactory post-drying properties and relatively high water contents, which entails large volume plant with long holding times and elevated energy input in order to remove the aqueous moisture. The polycarbonate powders produced according to European published patent application EP 0 616 002 A1 in particular have a relatively elevated water content. While the polycarbonate powder produced using this process does indeed have an elevated bulk density, it has a relatively high water content and thus requires a more elaborate drying process, because in this process all the energy to vaporise the solvent is applied by the steam incorporated into the solution. The steam condenses and must be removed from the polycarbonate by drying. In addition to the relatively high water content, the non-crystalline nature of the polycarbonate produced using the above process described in EP 0 616 002 A1 renders the elimination of the aqueous moisture more difficult because, due to the relatively low softening or tack temperature (approx. 150° C.) of the amorphous polycarbonate powder, this operation must proceed at below this temperature. Elimination of the aqueous moisture at lower temperatures requires larger volume plant, an extended holding time and a higher energy consumption and is thus less economic.

It is known per se to isolate polycarbonates from solutions thereof by vaporising the solvent to yield a crystalline solid. German published patent applications DE 4 022 232 and DE 4 134 483 describe a process for the production of partially crystalline polycarbonate by vaporising the solvent in a mixing apparatus with continuous or batch-wise discharge of pellets, by applying the polycarbonate solution onto initially introduced partially crystalline polycarbonate and vaporising the solvent. The occurrence of relatively large agglomerates of partially crystalline polycarbonate during this process is prevented by continuous shearing and circulation of the material in an apparatus specially designed for this purpose. Crystallisation is here induced by shearing.

These processes, however, have the disadvantage that costly apparatus is required for crystallisation and concentration of the solution, which substantially reduces the economic viability of the process. Moreover, only irregularly shaped particles are obtained using these processes, which particles are also still non-homogeneous with regard to crystallinity and contain elevated proportions of amorphous polycarbonates mixed with partially crystalline polycarbonates and thus have a tacky consistency on the surface. This impairs the drying properties of these particles.

The production of crystalline oligocarbonate powder is also known in principle. Published patent application WO 90/07536 thus describes a process in which oligocarbonate powder evaporated from a dichloromethane solution is crystallised by being suspended in dichloromethane or acetone and being left to stand. However, known processes have the disadvantage that the crystallites containing solvent have not entirely satisfactory post-drying properties and thus have an undesirable residual solvent content. Moreover, the crystalline oligocarbonates obtained using known processes are not so uniform with regard to crystallinity and grain size as the crystalline oligocarbonates produced using the process according to the invention. This applies in particular to oligocarbonates crystallised from dichloromethane.

It has been found that the concentrated pastes obtained on isolating thermoplastic aromatic polycarbonates or oligocarbonates from solutions thereof by evaporation in a heat exchanger or a holding tube using the novel process according to the invention spontaneously or after a certain holding time without applying shear forces, as in hitherto known processes, yield a crystalline solid which may be mechanically comminuted, for example by being pressed through screens of a mesh size of 1 to 5 mm, preferably of 2 to 3 mm, to yield a partially crystalline powder.

The present invention provides a process for the isolation of aromatic polycarbonate powders or of aromatic oligocarbonate in the form of a crystalline powder from polycarbonate solutions, which is characterised in that the polycarbonate solution or oligocarbonate having a PC concentration or oligocarbonate concentration of 3 to 30 wt. %, preferably of 15 to 25 wt. %, in solvents, preferably organic solvents, in particular dichloromethane, is concentrated in a heat exchanger or, after mixing with steam, in a holding tube or, after mixing with steam, in a heat exchanger to yield a concentrated paste of polycarbonate or oligocarbonate having a molecular weight, characterised by a solution viscosity $\eta_{rel.}$ of 1.00 to 1.40, preferably of 1.15 to 1.35 (polycarbonate) or of 1.08 to 1.15 (oligocarbonate), at a concentration of 5 to 80 wt. % of the concentrated paste, relative to polycarbonate or oligocarbonate, preferably of 25 to 60 wt. % and optionally condensed water, and is converted into a partially crystalline powder by subsequently holding for 1 minute to 2 hours in a crystalliser. The crystallisation time is in particular reduced by adding 0.1 to 15 wt. %, in particular 0.5 to 10 wt. %, preferably 0.7 to 2 wt. %, relative to polycarbonate or oligocarbonate, of crystallisation nuclei in the form of finely ground partially crystalline powder (having a grain size of 0.1 to 2 mm, preferably of 0.2 to 0.8 mm in diameter) or the degree of crystallinity, characterised by the heat of fusion, is increased at a constant crystallisation time.

It is in particular also possible to isolate thermoplastic aromatic polycarbonates or oligocarbonates from solutions thereof by evaporation in a heat exchanger or a holding tube with very small quantities of steam, or even without adding steam, optionally without introducing shear energy or apportioning crystallisation nuclei. Depending upon the grade of polycarbonate or oligocarbonate, the resultant polycarbonate pastes of varying consistency, namely from pasty to compact, in turn yield a crystalline solid spontaneously or by being left to stand, which may be mechanically comminuted to yield a powder, for example by being pressed through screens. The average particle diameter of the resultant powder is dependent, for example, on the mesh size of the screen.

It is preferably also possible to isolate thermoplastic aromatic polycarbonates or oligocarbonates from solutions thereof by evaporation in a heat exchanger without adding steam and without applying shear energy or adding crystallisation nuclei, wherein, depending upon the grade of polycarbonate or oligocarbonate, the resultant polycarbonate pastes of varying consistency, namely from pasty to compact, in turn yield a crystalline solid spontaneously or by being left to stand after evaporation of the solvent, which, in this variant too, may simply be mechanically comminuted to yield a powder, for example by being pressed through screens.

Once the solvent moisture has been removed, for example by steam stripping, residual solvent may particularly effectively be removed from the powders obtainable using the process according to the invention by using a relatively high temperature, in particular of above 150° C. in the drying process and the powders have a water content of in particular below 42 wt. % and an elevated bulk density (in particular of >0.3 g/cm$^3$, in particular of >0.35 g/cm$^3$ for oligocarbonate). The polycarbonate or oligocarbonate powders produced according to the invention may be particularly economically dried in simple dryers with little consumption of energy.

Aromatic polycarbonates or oligocarbonate used for the purposes of the process according to the invention are any aromatic homopolycarbonates, copolycarbonates and mixtures of these polycarbonates or any homo-oligocarbonates, which are in particular derived from the following diphenols:

hydroquinone, resorcinol, dihydroxydiphenyl, bis-(hydroxyphenyl)alkanes, bis-(hydroxyphenyl) cycloalkanes, bis-(hydroxyphenyl) sulphides, ethers, sulphoxides, sulphones and α,α'-bis-(hydroxyphenyl) diisopropylbenzenes, together with the ring-alkylated and ring-halogenated compounds thereof.

Suitable diphenols are described, for example, in U.S. patents U.S. Pat. No. 3,028,365, U.S. Pat. No. 2,999,835, U.S. Pat. No. 3,062,781, U.S. Pat. No. 3,148,172 and U.S. Pat. No. 4,982,014, in German published patent applications DE 1 570 703 and DE 2 063 050 and in the monograph "H. Schnell, *Chemistry and Physics of Polycarbonates*, Interscience Publishers, New York, 1964".

Preferred diphenols are:
4,4-dihydroxydiphenyl,
2,2-bis-(4-hydroxyphenyl)propane,
2,4-bis-(4-hydroxyphenyl)-2-methylbutane,
1,1-bis-(4-hydroxyphenyl)cyclohexane,
α,α'-bis-(4-hydroxyphenyl)-p-diisopropylbenzene,
α,α'-bis-(4-hydroxyphenyl)-m-diisopropylbenzene,
2,2-bis-(3-methyl-4-hydroxyphenyl)propane,
2,2-bis-(3-chloro-4-hydroxyphenyl)propane,
bis-(3,5-dimethyl-4-hydroxyphenyl)methane,
2,2-bis-(3,5-dimethyl-4-hydroxyphenyl)propane,
bis-(3,5-dimethyl-4-hydroxyphenyl) sulphone,
2,4-bis-(3,5-dimethyl-4-hydroxyphenyl)-2-methylbutane,
1,1-bis-(3,5-dimethyl4-hydroxyphenyl)cyclohexane,
α,α'-bis-(3,5-dimethyl-4-hydroxyphenyl)-p-diisopropylbenzene,
1,1-bis-(4-hydroxyphenyl)-3,3,5-trimethylcyclohexane,
1,1-bis-(4-hydroxyphenyl)-3-methylcyclohexane, 1,1-bis-(4-hydroxyphenyl)-3,3-dimethylcyclohexane,
1,1-bis-(4-hydroxyphenyl)-4-methylcyclohexane,
2,2-bis-(3,5-dichloro-4-hydroxyphenyl)propane,
2,2-bis-(3,5-dibromo-4-hydroxyphenyl)propane,
1,1-bis-(4-hydroxyphenyl)-1-phenylethane,
2,2-bis-(3,5-dimethyl-4-hydroxyphenyl)-2-phenylethane,
2,2-bis-(4-hydroxyphenyl)-2,2-diphenylethane,
9,9-bis-(4-hydroxyphenyl)fluorene,
9,9-bis-(3,5-dimethyl-4-hydroxyphenyl)fluorene.

Particularly preferred diphenols are, for example:
2,2-bis-(4-hydroxyphenyl)propane,
2,2-bis-(3,5-dimethyl-4-hydroxyphenyl)propane,
1,1-bis-(4-hydroxyphenyl)cyclohexane,
1,1-bis-(4-hydroxyphenyl)-1-phenylethane,
1,1-bis-(4-hydroxyphenyl)-3,3,5-trimethylcyclohexane,
1,1-bis-(4-hydroxyphenyl)-3-methylcyclohexane,
1,1-bis-(4-hydroxyphenyl)-4-methylcyclohexane,
9,9-bis-(3,5-dimethyl-4-hydroxyphenyl)fluorene.
2,2-Bis-(4-hydroxyphenyl)propane,1,1-bis-(4-hydroxyphenyl)-3,3,5-trimethylcyclohexane and 1,1-bis-(4-hydroxyphenyl)-1-phenylethane are in particular preferred.

Any desired mixtures of the above-stated diphenols may also be used to produce the polycarbonates or oligocarbonates.

In order to improve flow behaviour, it is possible also to use small quantities, preferably quantities of between 0.05 and 2.0 mol. % (relative to mol of diphenols used) of trifunctional or greater than trifunctional compounds, in particular those having three or more than three phenolic hydroxyl groups, in a known manner during synthesis of the polycarbonates. Some examples of usable compounds are:
1,3,5-tris-(4-hydroxyphenyl)benzene,
1,3,5-tris-(4-(4-hydroxyphenylisopropyl)phenyl)benzene,
1,1,1-tris-(4-hydroxyphenyl)ethane,
2,6-bis-(2-hydroxy-5'-methylbenzyl)-4-methylbenzene,
2-(4-hydroxyphenyl)-2-(2,4-dihydroxyphenyl)propane,
hexakis-(4-(4-hydroxyphenylisopropyl)phenyl)-orthoterephthalic acid ester, tetrakis-(4-hydroxyphenyl)methane,
1,4-bis-((4',4"-dihydroxytriphenyl)methyl)benzene,
3,3-bis-(4-hydroxyphenyl)-2-oxo-2,3-dihydroindole,
3,3-bis-(4-hydroxy-3-methylphenyl)-2-oxo-2,3-dihydroindole.

The chloroformates corresponding to these compounds are also suitable, together with the acids or preferably the acid chlorides of greater than dibasic aliphatic or aromatic carboxylic acids, thus for example 2,4-dihydroxybenzoic acid or 2,4-dihydroxybenzoic dichloride, trimesic acid or trimesic trichloride, trimellitic acid or trimellitic trichloride, cyanuric trichloride.

The polycarbonates or oligocarbonates or mixtures according to the invention may essentially be produced using the following known methods (cf. H. Schnell, *Chemistry and Physics of Polycarbonates, Polymer Review*, volume IX, pp. 27 et seq., Interscience Publishers, New York, 1964):

1. using the melt transesterification process;
2. using the disperse phase solution process, the so-called "two phase interface process".

In addition to or instead of the diphenols, it is also possible to use the chloroformates or bischloroformates thereof or to apportion them during synthesis of the polycarbonates.

Suitable solvents for the purposes of the invention are, for example, dichloromethane, monochlorobenzene, toluene, tetrahydrofuran or 1,3-dioxolane together with mixtures of the stated solvents.

Production of a polycarbonate solution may, for example, be described as follows:

Each hour, 61.2 kg of a solution prepared from 48.75 kg of 2,2-bis-(4-hydroxyphenyl)propane, 237 kg of water, 39.4 kg of 45% sodium hydroxide solution, 50 g of sodium hydridoborate and 750 g of p-tert.-butylphenol are continuously phosgenated in a suitable apparatus with 4.75 kg of phosgene in 90 kg of methylene chloride with the addition of 3 kg of 45% sodium hydroxide solution. After the addition of 40 g/h of triethylamine and 0.75 kg/h of 45% sodium hydroxide solution a polycarbonate of a relative viscosity of 1.303 is obtained after a holding time of half an hour.

Once the aqueous phase has been separated, the organic polycarbonate solution is passed for further processing after appropriate dilution or concentration.

Production of an oligocarbonate solution may, for example, be described as follows:

15 kg of 2,2-bis-(4-hydroxyphenyl)propane and 168 g of phenol are dissolved in a reactor in a mixture of 88 kg of water and 14.2 kg of 50 wt. % sodium hydroxide solution. 85 kg of dichloromethane are added to this solution and 6.4 kg of phosgene are introduced via an immersed tube with vigorous stirring. After approximately 1 hour's stirring, 13 g of triethylamine are added to the mixture and the mixture is left to react for one hour further with vigorous stirring. The phases are then separated and the organic phase repeatedly extracted in succession with dilute sodium hydroxide solution, water, dilute hydrochloric acid and water. The resultant solution is used in further processing.

The solution of aromatic polycarbonate or oligocarbonate in organic solvent to be used in the process according to the invention has a concentration of 3 wt. % to 30 wt. %, preferably of 5 wt. % to 20 wt. %.

The preferred addition of crystallisation nuclei is achieved in the form of crystalline PC powder obtained by the process according to the invention. The quantity of crystallisation nuclei used to accelerate crystallisation and to shorten crystallisation time and thus to convert the paste into a compact solid, is 0.1 wt. % to 15 wt. %, relative to the polycarbonate content of the polycarbonate solution, preferably of 0.5 wt. % to 10 wt. %.

Suitable solvents are any which adequately dissolve the polycarbonates or oligocarbonates (for example to a minimum of 5 wt. %) and have a boiling point of no more than 150° C. Preferred solvents are dichloromethane, monochlorobenzene, toluene, tetrahydrofuran or 1,3-dioxolane together with mixtures of the stated solvents. Dichloromethane is particularly preferred.

The steam optionally used according to the invention has a temperature of 100° C. to 300° C., preferably of 140° C. to 250° C.

The weight ratio of the polycarbonate solution solvent to steam is 7:1 to 1000:1. The process may also be operated entirely without the introduction of steam. The ratio of the polycarbonate solution solvent to steam is preferably 12:1 to 200:1.

The temperature of the heat exchanger is in particular 50° C. to 300° C., preferably from 150° C. to 250° C. At the beginning of the process, the polycarbonate solution preferably has a temperature of 10° C. to 200° C., more preferably of 60° C. to 120° C.

Further preferred embodiments of the invention may be found in the subordinate claims.

A suitable unit for incorporating steam into the polycarbonate solution is, for example, a T-shaped section of tube or an ejector type nozzle, preferably an ejector type nozzle. The possible addition of crystallisation nuclei in order to shorten the crystallisation time is achieved, for example, by adding them to the stream of steam or to the polycarbonate or oligocarbonate solution line approximately 20 mm to 100 mm upstream from the combining point with the steam or, in the method without using steam, approximately 20 mm to 100 mm upstream from the introduction of the polycarbonate or oligocarbonate solution into the heat exchanger.

The heat exchanger may be a tubular heat exchanger consisting of an inner tube with a jacket tube, in which the inner tube has a length to diameter ratio of 5000 to 100, preferably of 1000 to 250 and most preferably from 900 to 500 or any other desired heat exchanger having a heat exchange area equivalent to that of the tubular heat exchanger.

In the case of the method performed under standard pressure, the separator is, for example, a cylindrical vessel of a volume capable of holding approximately 2 hours' throughput of polycarbonate or oligocarbonate paste when half filled. The separator for the method performed under elevated pressure is a cylindrical vessel having a lower conical discharge section with a volume comparable to that of the separator described above.

The oligocarbonates isolated using the process according to the invention are suitable, by virtue of their low solvent content (i.e. a content of <2 ppm (detection limit)), as a blend component by mixing into polycarbonate or ABS for the production of mouldings. These mouldings made from polycarbonate or ABS blends are used in the conventional manner, for example in electronics, optics, vehicle construction and the lighting industry.

The polycarbonates isolated using the process according to the invention may be processed to yield mouldings by, for example, extruding the polycarbonates isolated as above to yield pellets and injection moulding these pellets, optionally after the addition of additives, dyes, fillers or glass fibres, in a known manner to obtain various articles.

Conventional quantities of other thermoplastics, i.e. between 10 and 50 wt. % relative to polycarbonate, may be blended with the isolated polycarbonates, usually for non-transparent applications.

Other suitable thermoplastics are, for example, optionally aromatic polyester carbonates, polycarbonates based on other bisphenols than the polycarbonates according to the invention, polyalkylene terephthalates, EPDM polymers, polystyrene and copolymers and graft copolymers, for example based on styrene, acrylonitrile and butadiene, such as in particular ABS.

These polycarbonate articles are used in the conventional manner, for example in electrical engineering, optics, vehicle construction and the lighting industry.

The invention is illustrated in greater detail below by the Figures, which show:

FIG. 1 a process diagram of the isolation process according to the invention

FIG. 2 a variant of the arrangement according to FIG. 1 with an additional separator 6 and heat exchanger 7

Figure 3:
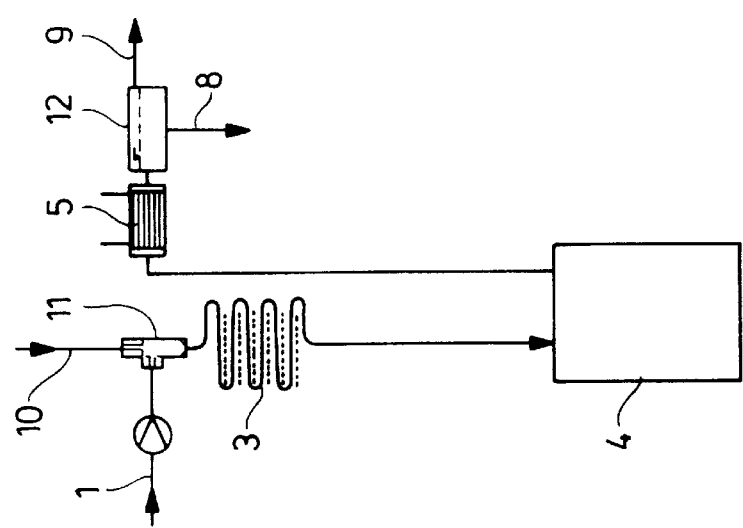

FIG. 3 a variant of the arrangement according to FIG. 1 with steam feed 11 instead of heat exchanger 2

FIG. 4 a variant of the arrangement according to FIG. 2 with steam feed 11 instead of heat exchanger 2.

According to FIG. 1, the temperature of the polycarbonate or oligocarbonate solution 1 is adjusted in a heat exchanger 2 and passed through a valve 13 into a holding tube 3, which may be heated. The solution is depressurised in a separator 4 and the solvent 8 condensed and separated in the condenser 5. The arrangement may be complemented by an intermediate separator 6 with a downstream heat exchanger (see FIG. 2). Steam 10 is optionally incorporated in a nozzle 11, which replaces the heat exchanger 2 (see FIG. 3 or FIG. 4).

EXAMPLES

Example 1

25 kg of polycarbonate based on bisphenol A and having an average molecular weight $M_w=29800$ are dissolved in 142 kg of dichloromethane. 77 kg/h of this 15 wt. % polycarbonate solution 1 are mixed in a nozzle 11 with 6 kg/h of steam 10 having a temperature of 195° C. and a pressure of 14.5 bar (corresponding to FIG. 3). This mixture is passed through a tube 3 having an internal diameter of 6 mm, a wall thickness of 1 mm and a length of 6 m into a cylindrical separator 4 of a volume of 60 l. The tube 3 is surrounded by a jacket tube which has an external diameter of 18 mm and a wall thickness of 1.5 mm. The feed temperature of the polycarbonate solution 1 in methylene chloride was 23° C. and the jacket heating temperature was 165° C.

The pasty, flowable concentrated polycarbonate solution is separated from the solvent vapour in the separator 4. The solvent vapour is passed to a heat exchanger 5 and condensed. Approximately 1 hour after completion of the test, a sample was taken from the separator 4, which exhibited the properties described in Table 1.

Example 2

78 kg/h of the 15 wt. % polycarbonate solution 1 in methylene chloride described in Example 1 are mixed with 2.5 kg/h of steam 10 at a pressure of 14.5 bar and a temperature of 195° C. as described in Example 1 and passed through a heated tube 3 to a separator 4 as described in Example 1. Instead of the nozzle 11 described in Example 1, a T-shaped tube having an internal diameter of 1 mm was used for mixing in this case. The jacket heating temperature was 195° C. The temperature of the polycarbonate solution 1 in methylene chloride was 23° C. The properties of the sample taken from the separator after approximately 1 hour are described in Table 1.

Example 3

47 kg of polycarbonate based on bisphenol A and having an average molecular weight $M_w=29800$ are dissolved in 180 kg of dichloromethane. 38 kg of dichloromethane were then evaporated from this solution. 37 kg/h of the resultant 25 wt. % polycarbonate solution 1 are passed through a heated tube 3, as described in Example 1, but without incorporating steam, the tube having an internal diameter of 6 mm and a length of 6 m into a cylindrical separator 4 having a volume of 60 l. The jacket tube heating temperature was 195° C. The feed temperature of the polycarbonate solution 1 in methylene chloride was 100° C. The properties of the sample taken from the separator 4 after approximately 1 hour are described in Table 1.

Example 4

31.2 kg of an oligomeric carbonate based on bisphenol A and having an average molecular weight $M_w=11400$ are dissolved in 142 kg of dichloromethane. 59 kg/h of this 18 wt. % oligocarbonate solution are mixed with 6 kg/h of steam 10 at a pressure of 14.5 bar and a temperature of 195°

C., as described in Example 1, in a nozzle 11 and passed through a heatable tube 3 having an internal diameter of 6 mm and a length of 4.5 m, as described in Example 1, into a cylindrical separator 4 having a volume of 60 l. The jacket tube was unheated in this Example. The temperature of the oligocarbonate solution in methylene chloride was 25° C. The properties of the sample taken from the separator 4 after approximately 1 hour are described in Table 1.

Example 5

60 kg/h of the 18 wt. % oligocarbonate solution described in Example 4 are mixed with 4 kg/h of steam 10 at a pressure of 14.5 bar and a temperature of 195° C., as described in Example 1, in a nozzle 11 and passed through a heatable tube 3 having an internal diameter of 6 mm and a length of 4.5 m, as described in Example 1, into a cylindrical separator 4 having a volume of 60 l. The jacket tube was unheated in this Example. The temperature of the oligocarbonate solution in methylene chloride was 25° C. The properties of the sample taken from the separator after approximately 1 hour are described in Table 1.

Example 6

60 kg/h of the 18 wt. % oligocarbonate solution described in Example 4 are mixed with 3 kg/h of steam 10 at a pressure of 14.5 bar and a temperature of 195° C., as described in Example 1, in a nozzle and passed through a heatable tube 3 having an internal diameter of 6 mm and a length of 4.5 m, as described in Example 1, into a cylindrical separator having a volume of 60 l. The jacket tube was heated to a temperature of 100° C. in this Example. The temperature of the oligocarbonate solution in methylene chloride was 25° C. The properties of the sample taken from the separator after approximately 1 hour are described in Table 1.

Example 7

37.5 kg/h of the 25 wt. % polycarbonate solution in methylene chloride described in Example 3 are mixed with 2 kg/h of steam 10 at a pressure of 14.5 bar and a temperature of 195° C., as described in Example 1, in a nozzle 11 and passed through a heatable tube 3 having an internal diameter of 6 mm and a length of 5.25 m, as described in Example 1, into a separator 6 (see FIG. 4). The tube heating temperature was 165° C. The temperature of the polycarbonate solution 1 in methylene chloride was 25° C. The separator has a volume of 40 l and is provided with a melt pump at the conical outlet. The pressure in the separator was maintained at 5 bar. The solvent vapour was passed through a condenser 5 and condensed. The melt located in the separator 4 was conveyed by means of the melt pump into a vessel 4, where it was depressurised to 1 bar, so vaporising further methylene chloride 8. The solvent vapour from this vessel was passed though a pipe into a condenser 3 and condensed. The properties of the sample taken from the vessel after approximately 1 hour are described in Table 1.

Example 8

77 kg/h of the 15 wt. % polycarbonate solution in methylene chloride described in Example 1 are mixed with 2.5 kg/h of steam at a pressure of 14.5 bar and a temperature of 195° C. as described in Example 1 in a nozzle 11 and passed through a heated tube into a separator 4 as described in Example 1. In this Example, 0.1 kg/h of the crystalline polycarbonate powder obtained according to Example 1 is finely ground (average grain size approximately 0.3 mm) and fed via the nozzle 11 shown in FIG. 3 with the steam 10 as crystallisation nuclei into the tube 3. The tube heating temperature was 195° C. The temperature of the polycarbonate solution in methylene chloride was 21° C. The properties of the sample taken from the separator 4 after approximately 1 hour are described in Table 1.

Comparative Example 61 kg/h of the 15% polycarbonate solution in methylene chloride described in Example 1 are mixed with 12.7 kg/h of steam at a pressure of 14.5 bar and a temperature of 195° C. as described in Example 1 in a nozzle and passed through a heatable tube having an internal diameter of 6 mm and a length of 5.9 m, as described in Example 1, into a separator. The first 4.5 m of the tube downstream from the nozzle were not heated. The final 1.5 m section of the tube was heated. The temperature of the heating medium was 195° C. The temperature of the polycarbonate solution in methylene chloride was 104° C. A cyclone having a volume of 40 l was used as the separator, the conical discharge section of which is provided with a star wheel lock. The pressure in the separator was 1 bar. The solvent vapour was passed through a condenser and condensed. A pulverulent agglomerate was obtained in the separator, which was conveyed into a vessel by means of the star wheel lock. The properties of the sample taken from the vessel after approximately 1 hour are described in Table 1.

TABLE 1

| | MC content (wt. %) | Water content (wt. %) | Residual MC content (ppm)* | Bulk density (g/cm$^3$) | Heat of fusion (J/g) | Melting point (°C.) |
|---|---|---|---|---|---|---|
| Example 1 | 31.4 | 17.0 | <2 | 0.39 | 19.4 | 248 |
| Example 2 | 46.5 | 10.5 | <2 | 0.37 | 17.5 | 252 |
| Example 3 | 53.5 | — | <2 | 0.37 | 14.6 | 252 |
| Example 4 | 8.0 | 41.0 | <2 | 0.37 | 17.8 | 221 |
| Example 5 | 49.5 | 21.0 | <2 | 0.54 | 33.9 | 248 |
| Example 6 | 38.5 | 18.0 | <2 | 0.56 | 32.4 | 248 |
| Example 7 | 30.5 | 13.0 | <2 | 0.35 | 17.5 | 252 |
| Example 8 | 45.0 | 10.0 | <2 | 0.45 | 29.3 | 260 |
| Comparative Example | 7.6 | 29.1 | 19 | 0.15 | amorphous | — |

*after drying

Example 9

47 kg of an oligomeric carbonate based on bisphenol A and having an average molecular weight $M_w$=11400 are dissolved in 180 kg dichloromethane. 38 kg of dichloromethane were then evaporated from this solution. 37 kg/h of the resultant 25% oligocarbonate solution 1 are passed in accordance with FIG. 1 through a heat exchanger 2 and a tube 3 having an internal diameter of 6 mm, a wall thickness of 1 mm and a length of 6 m into a cylindrical separator 4 having a volume of 60 l. The tube 3 is surrounded by a jacket tube which has an external diameter of 18 mm and a wall thickness of 1.5 mm. The feed temperature of the oligocarbonate solution in methylene chloride was 38° C. and the jacket tube heating temperature was 220° C. The solvent was separated in the condenser 5 and removed. The properties of the sample taken from the separator 4 after approximately 1 hour are described in Table 2.

Example 10

31.2 kg of an oligomeric carbonate based on bisphenol A and having an average molecular weight $M_w$=11400 are dissolved in 142 kg of dichloromethane. 59 kg/h of this 18% oligocarbonate solution are mixed in an arrangement in accordance with FIG. 3 with 6 kg/h of steam having a pressure of 14.5 bar and a temperature of 195° C. in a nozzle 11 and passed through a heatable tube 3 having an internal diameter of 6 mm and a length of 4.5 m, as described in Example 9, into a cylindrical separator 4 having a volume of 60 l. The jacket tube was unheated in this Example. The temperature of the oligocarbonate solution in methylene chloride was 25° C. Solvent 8 and water 9 were condensed 5 and separated from each other 12. The properties of the sample taken from the separator 4 after approximately 1 hour are described in Table 2.

Example 11

60 kg/h of the 18% oligocarbonate solution described in Example 10 are mixed with 4 kg/h of steam having a pressure of 14.5 bar and a temperature of 195° C., as described in Example 10, in a nozzle 11 and passed through a heatable tube 3 having an internal diameter of 6 mm and a length of 4.5 m, as described in Example 1, into a cylindrical separator 4 having a volume of 60 l. The jacket tube was unheated in this Example. The temperature of the oligocarbonate solution in methylene chloride was 25° C. The properties of the sample taken from the separator after approximately 1 hour are described in Table 2.

Example 12

60 kg/h of the 18% oligocarbonate solution described in Example 10 are mixed with 3 kg/h of steam having a pressure of 14.5 bar and a temperature of 195° C., as described in Example 10, in a nozzle 11 and passed through a heatable tube 3 having an internal diameter of 6 mm and a length of 4.5 m, as described in Example 9, into a cylindrical separator 4 having a volume of 60 l. The jacket tube was heated with steam at a temperature of 100° C. in this Example. The temperature of the oligocarbonate solution in methylene chloride was 25° C. The properties of the sample taken from the separator after approximately 1 hour are described in Table 2.

Comparative Example 2

0.5 g of a pulverised oligomeric carbonate based on bisphenol A and having an average molecular weight M=11400 is stirred with 0.15 kg of dichloromethane and left to stand for 24 hours at room temperature. The mixture is then dried at 180° C. in a vacuum cabinet and finely ground. The properties of the powder are described in Table 2.

We claim:

1. Process for the isolation of polycarbonate powders or oligocarbonate powders from solutions of aromatic polycarbonates or oligocarbonate, characterised in that the polycarbonate or oligocarbonate solution having a polycarbonate or oligocarbonate concentration of 3 to 30 wt. % is concentrated in a heat exchanger or, after mixing with steam, in a holding tube or, after mixing with steam, in a heat exchanger to yield a concentrated paste of polycarbonate or oligocarbonate having a molecular weight, characterised by a solution viscosity $\eta_{rel.}$, of 1.00 to 1.40 at a concentration of the concentrated paste of 5 to 80 wt. %, relative to polycarbonate or oligocarbonate, and optionally condensed water, wherein the weight ratio of polycarbonate or oligocarbonate solution solvent to optionally used water is 7:1 to 1000:1, and is converted into crystalline powder by subsequently holding for 1 minute to 2 hours in a crystalliser.

2. Process according to claim 1, characterised in that the polycarbonate or oligocarbonate solution is concentrated in an intermediate separator at a pressure of 1 to 10 bar and is subsequently depressurised to standard pressure in the crystalliser.

3. Process according to claim 2, characterised in that the concentrated polycarbonate or oligocarbonate solution is heated to a temperature of 60° C. to 220° C. by being passed through a heat exchanger before the subsequent depressurisation to standard pressure.

4. Process according to claim 1, characterised in that a 15 to 25 wt. % polycarbonate or oligocarbonate solution is used.

5. Process according to claim 1, characterised in that organic solvents are used as the solvent for the polycarbonate or oligocarbonate.

6. Process according to claim 1, characterised in that polycarbonate having a relative viscosity of 1.15 to 1.35 is used.

7. Process according to claim 1, characterised in that oligocarbonate having a relative viscosity of 1.08 to 1.15 is used.

8. Process according to claim 1, characterised in that a paste concentration of 25 to 60 wt. % is established in the crystalliser.

9. Process according to claim 1, characterised in that 0.1 to 15 wt. %, of crystallisation nuclei in the form of partially crystalline polycarbonate powder are added in order to reduce the crystallisation time of the polycarbonate solution.

10. Process according to claim 1, characterised in that steam of a temperature of 100° C. to 300° C., is incorporated into the polycarbonate solution upstream from the heat exchanger or holding tube.

TABLE 2

|  | MC content (wt. %) | Water content (wt. %) | Residual MC content (ppm)[1] | Bulk density (g/cm$^3$) | Heat of fusion (J/g) | Melting point (°C.) | Solution viscosity $\eta$rel.[2] |
|---|---|---|---|---|---|---|---|
| Example 9 | 53.5 | — | <2 | 0.56 | 33.8 | 249 | 1.52 |
| Example 10 | 3.0 | 41.0 | <2 | 0.37 | 17.8 | 221 | 1.48 |
| Example 11 | 49.5 | 21.0 | <2 | 0.54 | 33.9 | 248 | 1.29 |
| Example 2 | 38.5 | 18.0 | <2 | 0.56 | 32.4 | 248 | 1.53 |
| Comparative example 2 | — | — | 9 | 0.60 | 34.0 | 249 | not measurable[3] |

[1] after drying, 3 h at 180° C.
[2] after solid phase post-condensation, 5 h at 220° C. in a stream of nitrogen.
[3] reaction product is incompletely soluble in dichloromethane.

11. Process according to claim 10, characterised in that the weight ratio of polycarbonate solution solvent to steam is 12:1 to 200:1.

12. Process according to claim 1, characterised in that the polycarbonate solution is concentrated in a holding tube, in which the holding tube has a ratio of length to internal diameter of 5000 to 100.

13. Process according to claim 5 wherein the organic solvents are selected from the group consisting of dichloromethane, monochlorobenzene, toluene, tetrahydrofuran and 1,3-dioxolane.

14. Process according to claim 9 wherein the crystallization nuclei in the form of partially crystalline polycarbonate powder is 0.5 to 10 wt. %.

15. Process according to claim 10 wherein the steam has a temperature of 140° C. to 250° C.

16. Process according to claim 12 wherein the holding tube has a ratio of length to internal diameter of 1000 to 250.

17. Process according to claim 16 wherein the holding tube has a ratio of length to internal diameter of 900 to 500.

* * * * *